United States Patent
Kestur Nagarajan et al.

(10) Patent No.: US 7,927,116 B2
(45) Date of Patent: Apr. 19, 2011

(54) ELECTRICAL CARD CONNECTOR WITH IMPROVED EJECTION MECHANISM

(75) Inventors: Nagesh Kestur Nagarajan, Singapore (SG); Yan Margulis, Buffalo Grove, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 12/615,556

(22) Filed: Nov. 10, 2009

(65) Prior Publication Data

US 2010/0120277 A1     May 13, 2010

(30) Foreign Application Priority Data

Nov. 13, 2008    (SG) .............................. 200808440-2

(51) Int. Cl.
*H01R 13/62* (2006.01)
(52) U.S. Cl. .................. 439/159; 439/167; 439/377
(58) Field of Classification Search .................. 439/159, 439/160, 377
See application file for complete search history.

(56) References Cited

U.S. PATENT DOCUMENTS

| | | | | |
|---|---|---|---|---|
| 5,713,750 | A | 2/1998 | Ho | |
| 5,899,763 | A | 5/1999 | Kajiura | |
| 5,993,227 | A * | 11/1999 | Hsia et al. | 439/159 |
| 6,027,350 | A | 2/2000 | Chen et al. | |
| 6,142,801 | A * | 11/2000 | Koseki et al. | 439/159 |
| 6,162,075 | A * | 12/2000 | Hara et al. | 439/159 |
| 6,609,918 | B2 * | 8/2003 | Uchikawa | 439/159 |
| 6,619,971 | B1 * | 9/2003 | Chen | 439/159 |
| 6,796,816 | B2 * | 9/2004 | He | 439/159 |
| 7,491,073 | B2 * | 2/2009 | Cheng | 439/159 |
| 7,510,415 | B2 * | 3/2009 | Wang | 439/159 |
| 7,614,891 | B2 * | 11/2009 | Yu | 439/159 |

OTHER PUBLICATIONS

Australian Search Report for SG200808440-2.

* cited by examiner

*Primary Examiner* — Hae Moon Hyeon
(74) *Attorney, Agent, or Firm* — Stephen L. Sheldon (57) ABSTRACT

An electrical card connector comprises an insulative housing, a shield covering the insulative housing, a plurality of terminals received within the insulative housing, and an ejection mechanism. The insulative housing and the shield define a receiving space for receiving an electrical card. The ejection mechanism disposed on one side of the receiving space comprises a base and a movable push rod mounted within the base. A reinforced rib protruding from a surface of the rear portion of the push rod, and a corresponding receiving groove is defined on the base for receiving said the reinforced rib movable therein. A guide groove is defined on the bottom wall of the push rod, and a guide rib protrudes from the base, which is received within said guide groove and movable therein.

9 Claims, 10 Drawing Sheets

ELECTRICAL CARD CONNECTOR WITH IMPROVED EJECTION MECHANISM

FIELD OF THE INVENTION

The present invention relates to an electrical card connector, and more particularly, to an electrical card connector having an ejection mechanism.

DESCRIPTION OF THE RELATED ART

An electrical card connector is often equipped with an ejection mechanism, among which the most popular are those operated by means of a push rod. Because the push rod, which is generally made of plastic and has lower mechanical strength, extends outside of an electronic device for being pushed by a user, it may be shifted in an incorrect position or even broken by an external force, resulting in a negative effect on the reliability of card ejection.

Figure 1:
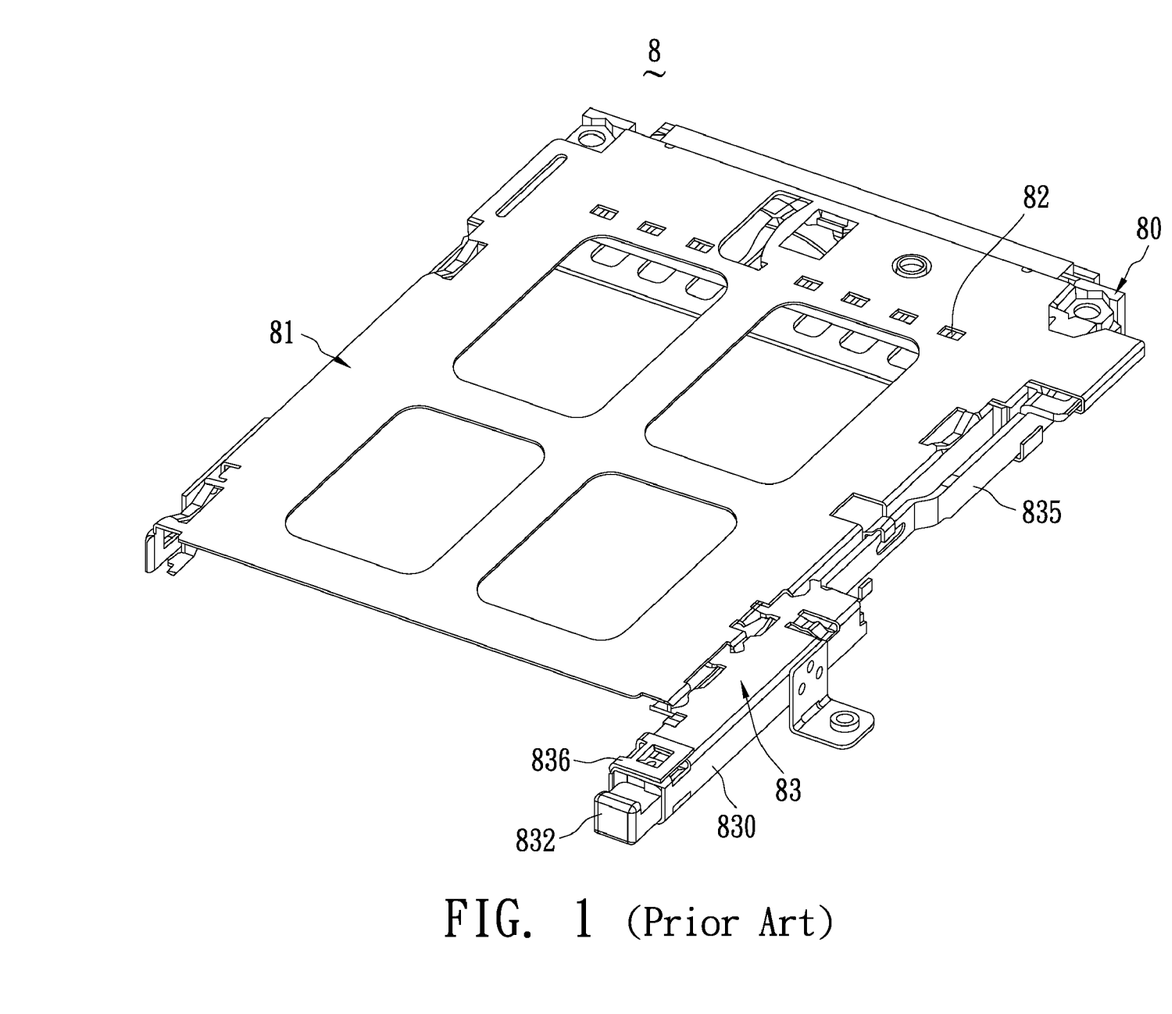
FIG. 1 is a perspective view of a prior art electrical card connector.
Figure 2:
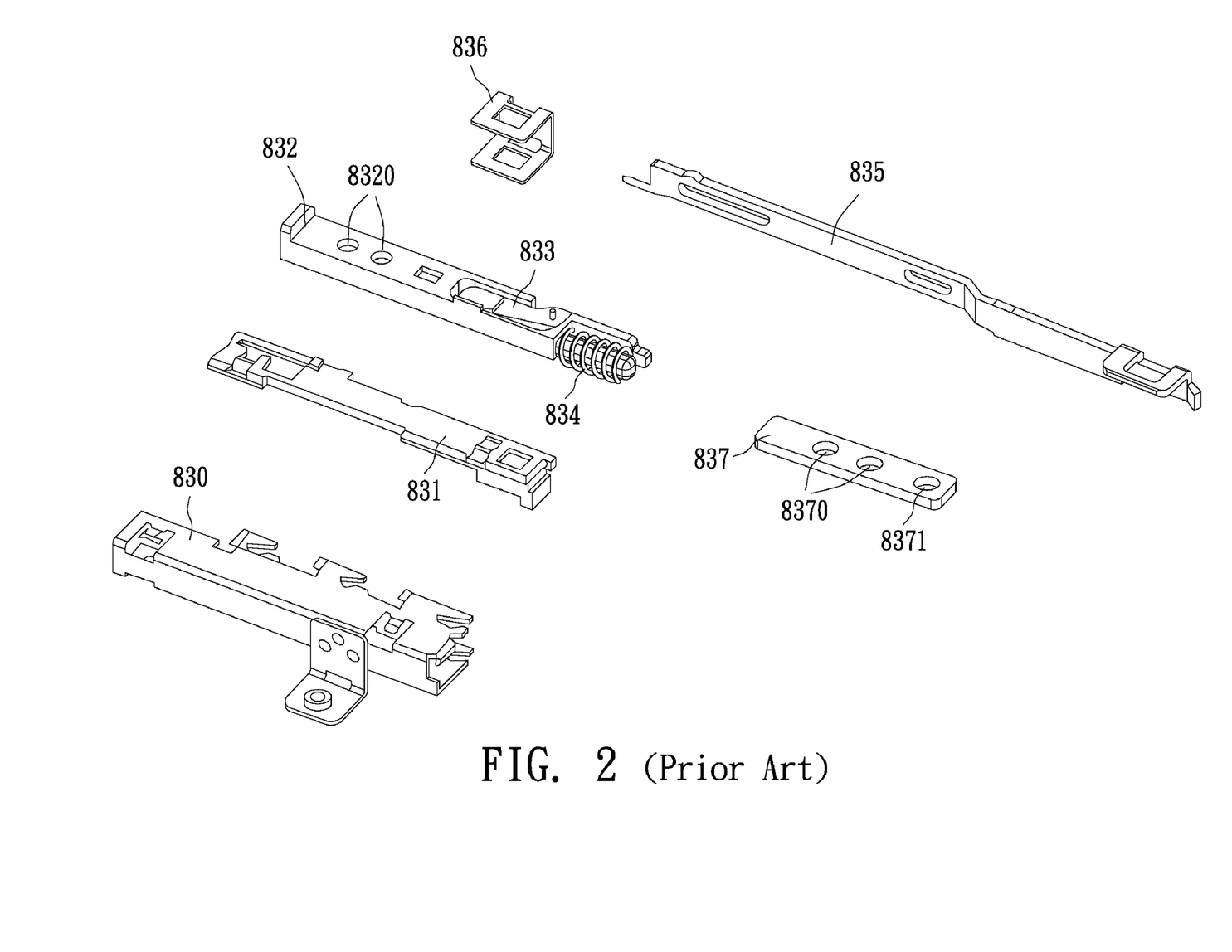
FIG. 2 is a perspective exploded view of the ejection mechanism of FIG. 1.

In order to solve such problem, Taiwan Patent No. M332312 discloses a modified electrical card connector. As shown in FIGS. 1-2, the electrical card connector 8 comprises an insulative housing 80, a shell 81 covering the insulative housing 80, a plurality of terminals 82 received within the insulative housing 80 and an ejection mechanism 83 mounted on one side of the electrical card connector 8. The ejection mechanism 83 comprises an operating part and an ejection part. The operating part comprises a metal frame 830; a base 831 having a heart-shaped track (not shown); a push rod 832 received within the metal frame 830; a control means 833, which slides within the heart-shaped track of the base 831, and is also configured for holding the push rod 832 at some specific situation; an elastic element 834 providing elastic force; a driving rod 835 configured for transmitting force from the push rod 832 to the ejection part; and a clamping element 836. The metal frame 830, which is disposed on one side of the shell 81, and the clamping element 836 are assembled together so as to form a void for receiving the base 831 and the push rod 832. The push rod 832 made of plastic material is embedded with a metal piece 837 configured for enhancing the mechanical strength of the push rod 832. Two holes 8320 penetrating through and disposed along the longitudinal direction of the push rod 832 correspond with the two holes 8370 formed on the metal piece 837, and said holes 8320, 8370 are used for positioning during the molding process of the push rod 832. The metal piece 837 further comprises a penetrating hole 8371 aligned with the two holes 8370. Plastic material is filled into the penetrating hole 8371, so as to improve the bonding strength between the plastic push rod 823 and the metal piece 837.

The mechanical strength of the push rod 832 is improved by embedding the metal piece 837 in the push rod 832, and the occurrence of breakage of the push rod 832 is prevented. However, a push rod 832 embedded with a metal piece 837 cannot be formed integrally, but is formed by injecting plastic material into a mold where the metal piece 837 is placed in advance. Consequently, the manufacturing cost and complexity are increased due to the molding process, and more time and cost may be incurred because of the difficulty of manufacturing such a complex mold. Moreover, the metal piece 837 solely enhance mechanical strength of the push rod 832, but the metal frame 830 enclosing the push rod 832 is made of a thin metal film, and therefore the push rod 832 may easily deform the metal frame 830 when an unexpected force is applied thereon. As a result of such deformation, the lateral or vertical position of the push rod 832 relative to the base 831 would be changed, and forcing the control means 833 run out of the heart-shaped track of the base 831, thus malfunction will occur. The above-mentioned ejection mechanism 83 embedded with a metal piece 837 cannot solve above-mentioned problems.

Therefore, a new electrical card connector which can resolve the above-mentioned problems is introduced.

SUMMARY OF THE INVENTION

An objective of the present invention is to provide an electrical card connector comprising a strengthened ejection mechanism with lower cost and simplification manufacturing process.

To achieve the above objective, an electrical card connector of the present invention comprising an insulative housing; a shield covering the insulative housing, wherein the shield and the insulative housing define a receiving space for receiving an electrical card; a plurality of terminals received within the insulative housing; and an ejection mechanism disposed on one side of the receiving space, the ejection mechanism comprising a base and a movable push rod mounted within the base; wherein a reinforced rib protrudes from a surface of a rear portion of the push rod, and a corresponding receiving groove is defined on the base for receiving said the reinforced rib movable therein. A guide groove is defined on a surface of the rear portion of the push rod, and a guide rib protrudes from the base, which is received within said guide groove and movable therein.

Compared to the electrical card connector of the prior art, the push rod of the electrical card connector according to present invention is disposed with a reinforced rib and the base is disposed with a receiving groove corresponding to the reinforced rib. The reinforced rib enhances the mechanical strength of the push rod and prevents the breaking thereof. Furthermore, the engagement between the reinforced rib and the receiving groove, as well as the engagement between the guide groove and the guide rib, serve to confine the push rod in both lateral and vertical directions and prevent the push rod from shifting, thereby ensuring the reliability and extending the lifetime of the electrical card connector.

BRIEF DESCRIPTION OF THE DRAWINGS

The invention will be described according to the appended drawings in which.

DETAILED DESCRIPTION OF THE INVENTION

Figure 3:
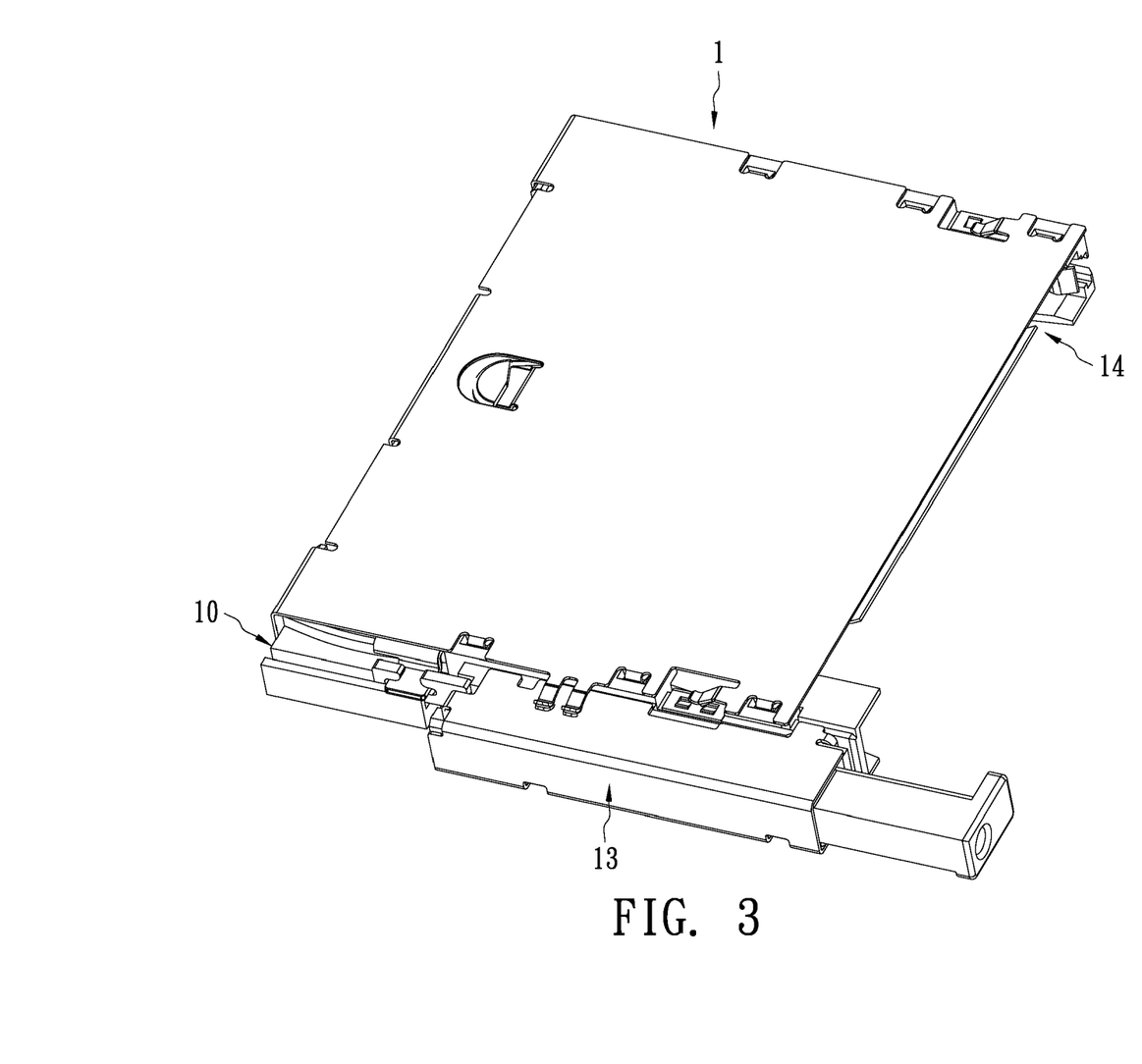
FIG. 3 is a perspective view of an electrical card connector according to a preferred embodiment of the present invention.
Figure 4:
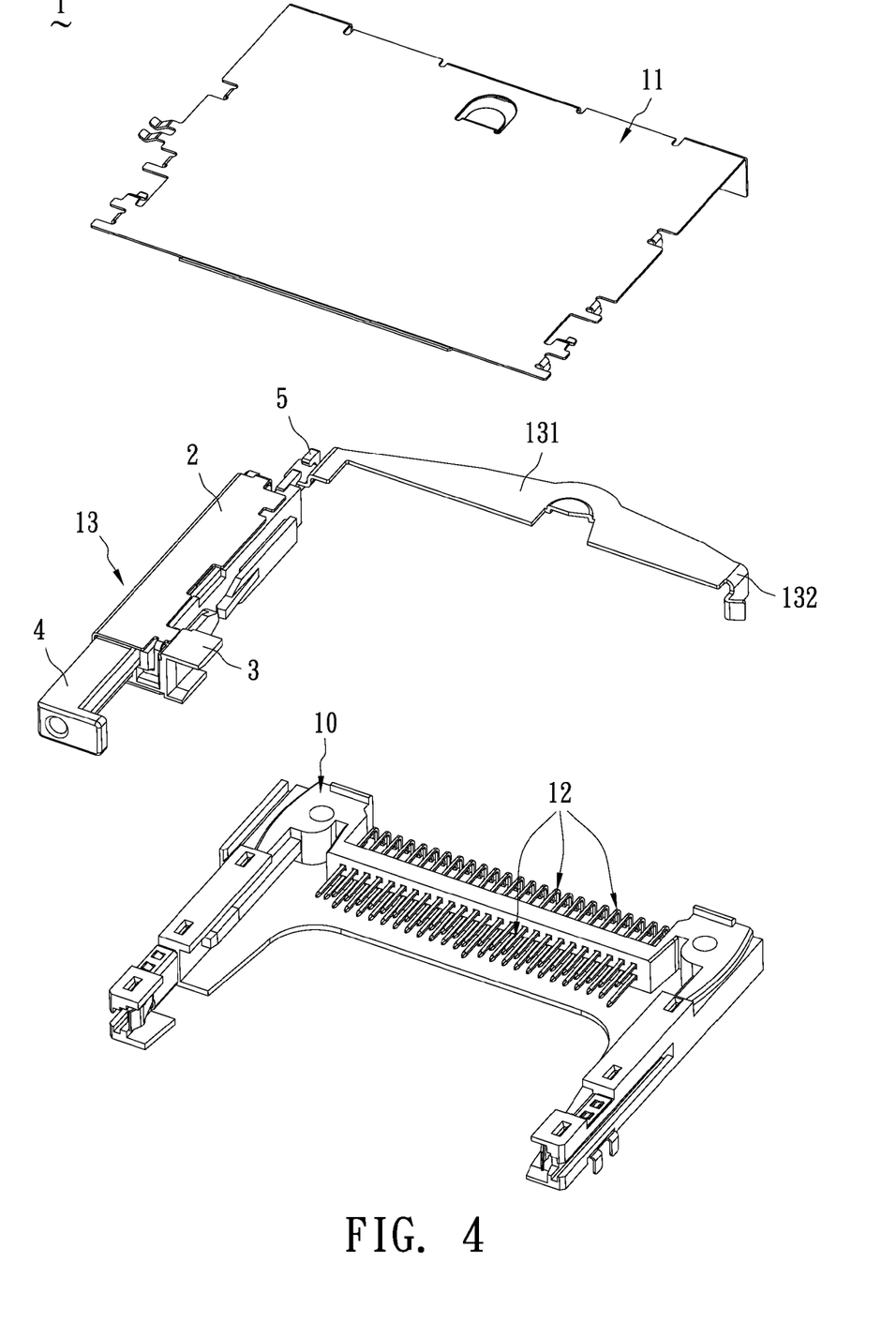
FIG. 4 is a perspective exploded view of FIG. 3 according to a preferred embodiment of the present invention.
Figure 5:
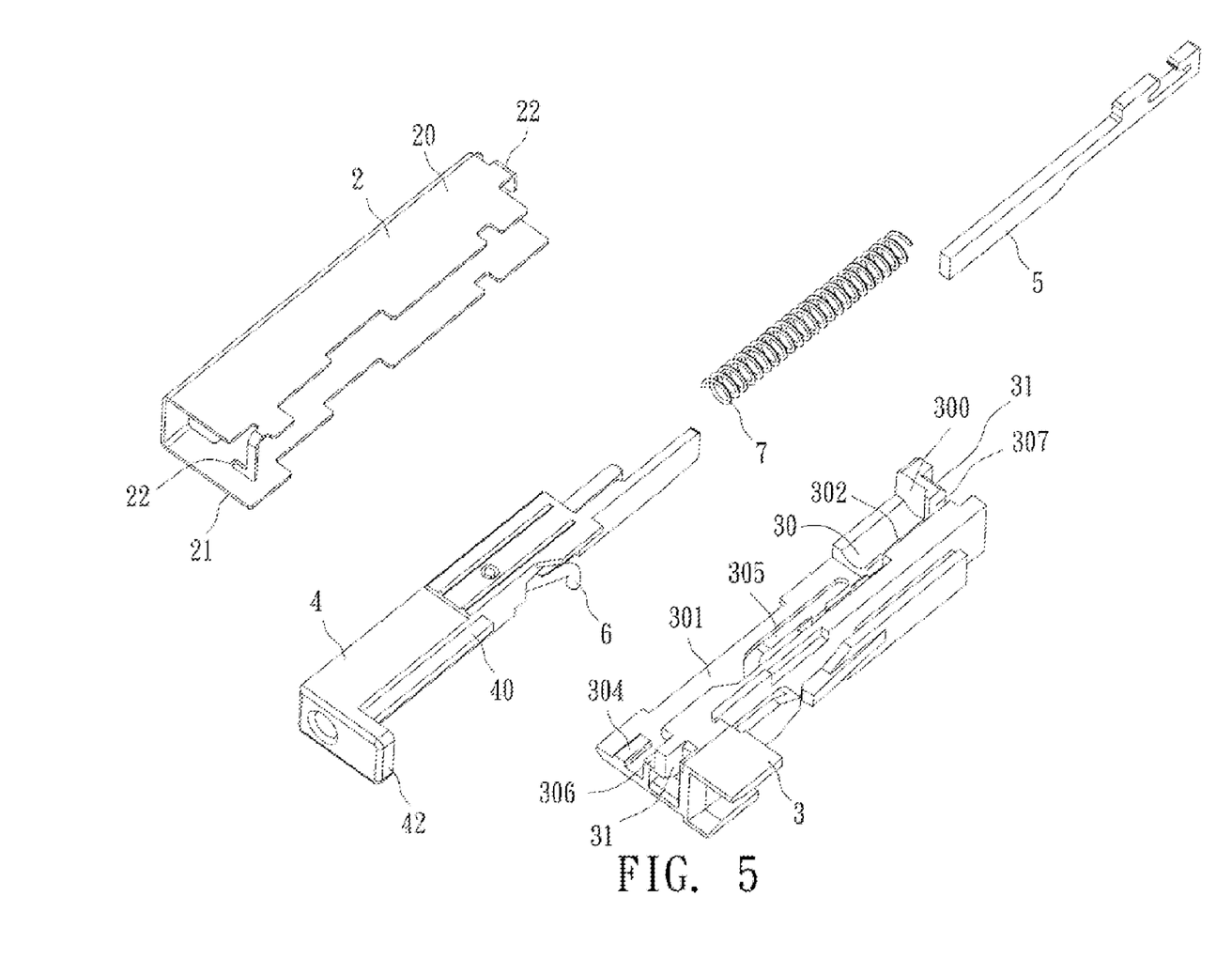
FIGS. 5-7 are perspective exploded views of an ejection mechanism, without showing the swing lever according to a preferred embodiment of the present invention.
Figure 6:
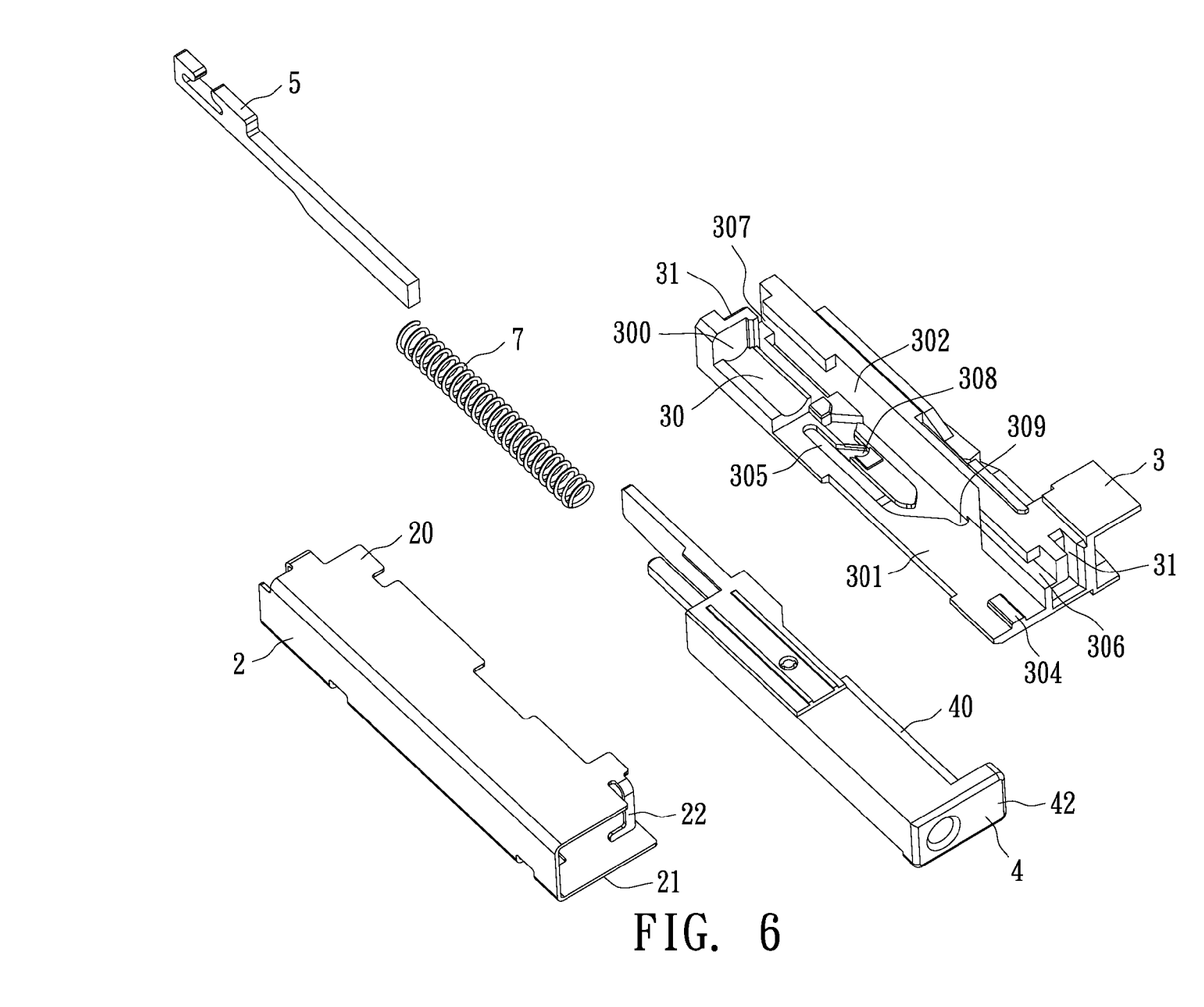
Figure 7:
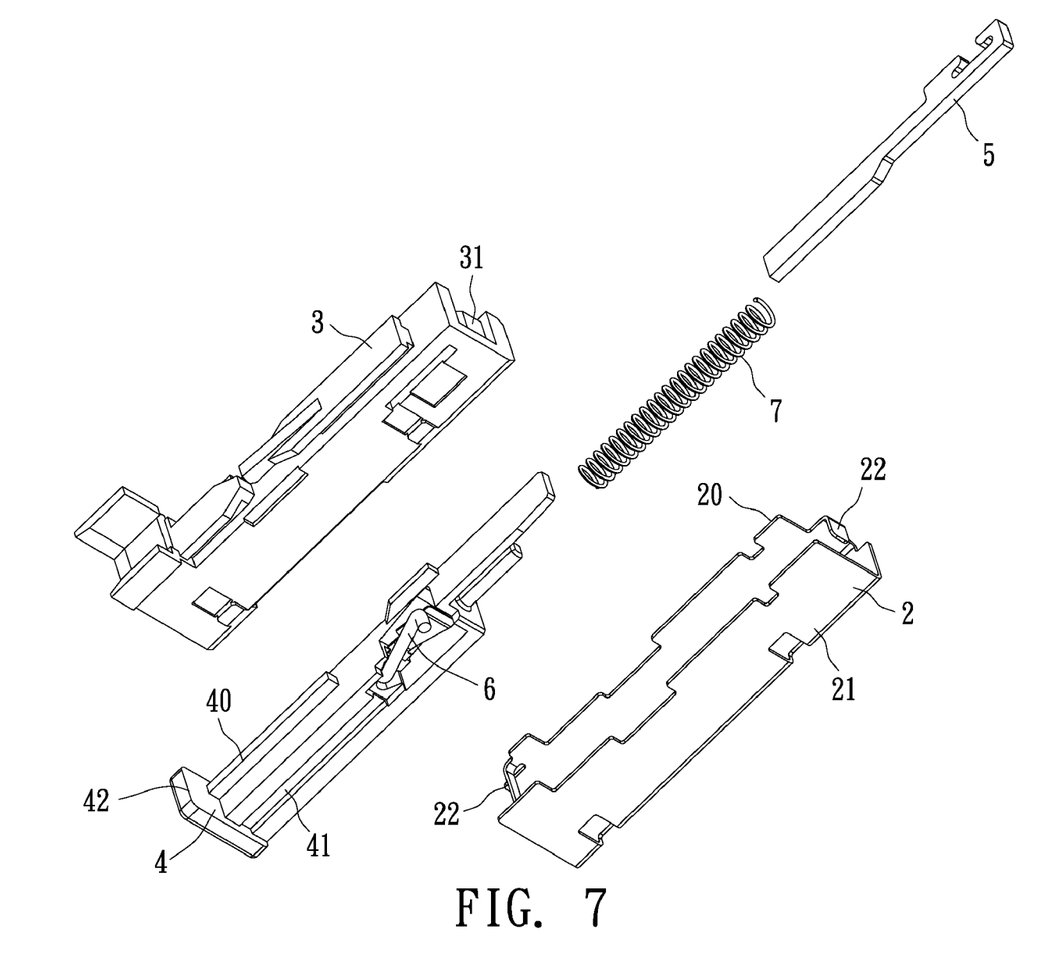

Referring to FIGS. 3-5, the electrical card connector 1 in accordance with a preferred embodiment of the present invention comprises an insulative housing 10, a shield 11 covering the upper side of the insulative housing 10, a plurality of terminals 12 received within the insulative housing 10, and an ejection mechanism 13. The insulative housing 10 and the shield 11 define a receiving space 14 configured for receiving an inserted electrical card. The ejection mechanism 13 for ejecting an inserted electrical card is disposed on one side of the receiving space 14.

The ejection mechanism 13 comprises a base 3, a push rod 4, a metal frame 2 enclosing the base 3 and the push rod 4, a driving bar 5 driven by the force from the push rod 4 and moving relative to the base 3, a shift lever 6 configured for selectively positioning the push rod 4 at different locations relative to the base 3, an elastic element 7 configured for providing elastic restoration force to the push rod 4, and a swing lever 131 engaging the driving bar 5, configured for ejecting an electrical card out of the electrical card connector 1. The base 3 and the push rod 4 are disposed within the metal frame 2.

Referring to FIGS. 5-8, the metal frame 2, enclosing peripherally the push rod 4 and the base 3, and extending along the electrical card insertion/ejection direction, has a top wall 20 and a bottom wall 21, which are parallel to each other. The shield 11 is connected to the metal frame 2 by engaging the top wall 20. Tab-like retention clips 22 extend downward from both the front and back ends of the top wall 20.

A recess 30, surrounded by a front wall 300, a bottom wall 301 and a side wall 302, is concavely formed in the base 3. On the bottom wall 301, a guide rib 304 is disposed close to the back end, and a heart-shaped positioning track 305 is disposed around the middle portion. One end of the shift lever 6 is held in the push rod 4; and the other end confined in the positioning track 305 is configured for selectively positioning the push rod 4 according to the insertion or ejection of the electrical card. A receiving groove 306 is formed on the side wall 302 along the longitudinal direction of the base 3. A guide slot 307 is defined on the front wall 300 of the base 3; thereby the driving bar 5 can move back and forth therein. Two retention grooves 31 are defined at the front and back ends of the base 3 respectively, for mating with the retention clips 22 of the metal frame 2 correspondingly, and through the engagement, the base 3 can be firmly fixed to the metal frame 2. There are many different types of retention clips 22 and the retention grooves 31 that correspond to the type of retention clips 22 chosen can be used in accordance with this invention. In the present embodiment, one of the retention clips 22 extending downward from rear end of the top wall 20 has an L-shaped cross-section, and a corresponding L-shaped retention groove 22 is defined in rear end of the base 3. When the metal frame 2 and the base 3 are assembled together, the L-shaped retention clips 22 will prevent the departure of the metal frame 2 from the base 3 and will also not allow the base 3 to move backward relative to the metal frame 2.

The movable push rod 4 is mounted within the recess 30 of the base 3 in a manner permitting a sliding motion. The elastic element 7 disposed between the push rod 4 and the front wall 300 provides elastic restoration force to the push rod 4. A reinforced rib 40 protrudes along the central line of the side surface of the rear portion of the push rod 4, facing the side wall 302 of the base 3. When the base 3 and the push rod 4 are assembled, the reinforced rib 40 is received in the receiving groove 306 of the base 3 and slides therein during movement of the push rod 4. A guide groove 41, defined on the bottom surface and extends along the longitudinal direction of the push rod 4, is configured for receiving the guide rib 304. The guide rib 304 slides in the guide groove 41 when the push rod 4 is pushed by a user. A transversely extending handle 42 is disposed at the rear end of the push rod 4. The reinforced rib 40 extends along a longitudinal direction in the surface of the push rod, and joins with the handle 42.

Referring to FIGS. 3-7, the following description briefly discloses the operation of the ejection mechanism 13. During the insertion of an electrical card into the receiving space 14, the lever end 132 of the swing lever 131 is pushed by the electrical card so as to rotate the swing lever 131 in an anti-clockwise direction. Due to the rotation of the swing lever 131, the driving bar 5 is pushed backward, so that the rear end of the driving bar 5 can be driven by the shift lever 6 in the subsequent electrical card ejecting operation. When the ejection mechanism 13 is operated by a user, the push rod 4 is initially pushed forward and the shift lever 6 moves along the rail, close to the side wall 302, of the positioning track 305. At the same time, the shift lever 6 contacts the rear end of driving bar 5 and pushes it forward along the guide slot 307. Then the driving bar 5 drives an end of the swing lever 131, so as to rotate the swing lever 131 in a clockwise direction. The lever end 132 of the swing lever 131 pushes the electrical card out of the receiving space 14. Subsequently, the shift lever 6 moves backward for a distance and is held at the concave position 308 of the positioning track 305 after the push rod 4 is released by the user. When the push rod 4 is pushed once again, the elastic element 7 exerts an elastic restoration force on the push rod 4 so that the push rod 4 moves backward and the shift lever 6 follows the other rail, farther away from the side wall 302, of the positioning track 305 to return to the initial position 309. The working principle of the ejection mechanism is quite well understood by people skilled in the art, and therefore need not be described further.

Figure 8:
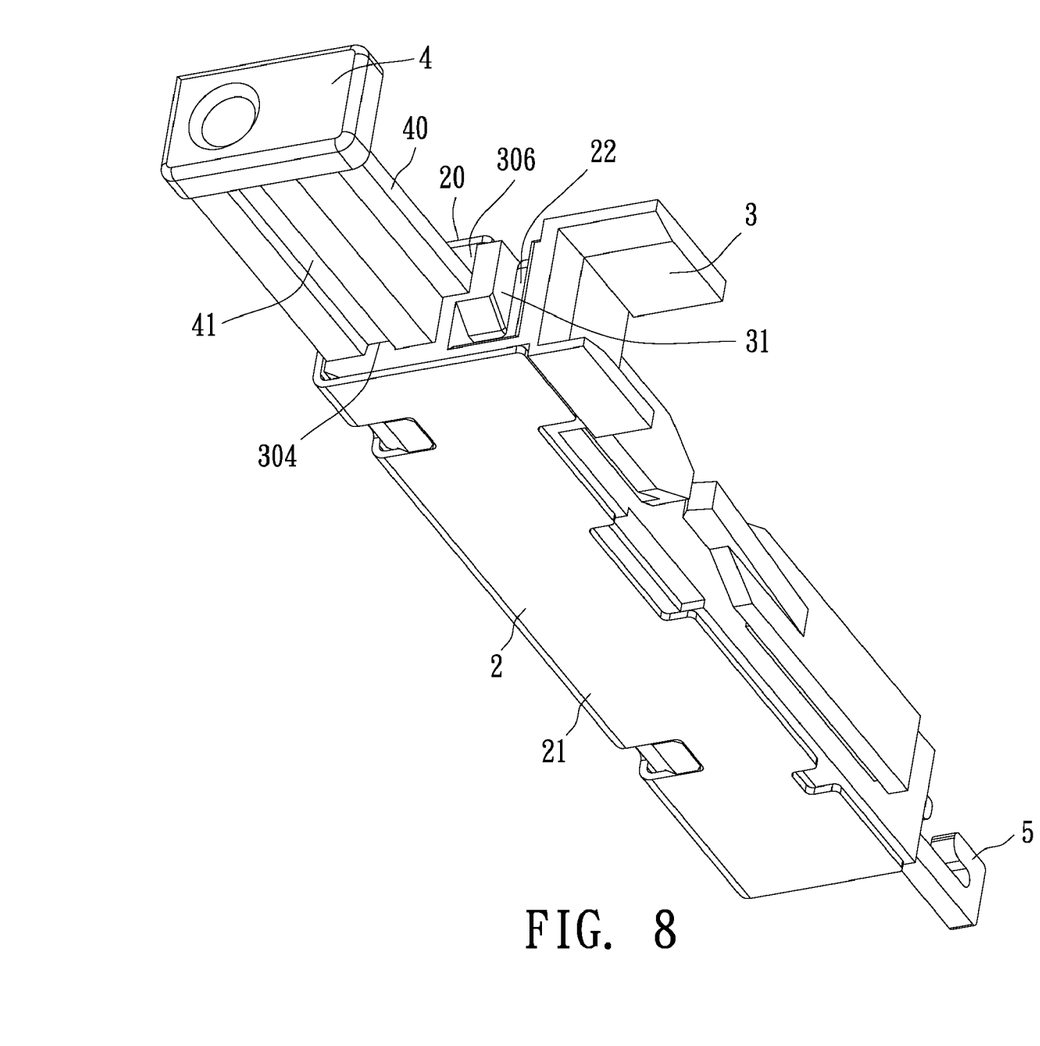
FIG. 8 is a perspective view of the ejection mechanism of FIG. 4, without showing the swing lever according to a preferred embodiment of the present invention.
Figure 9:
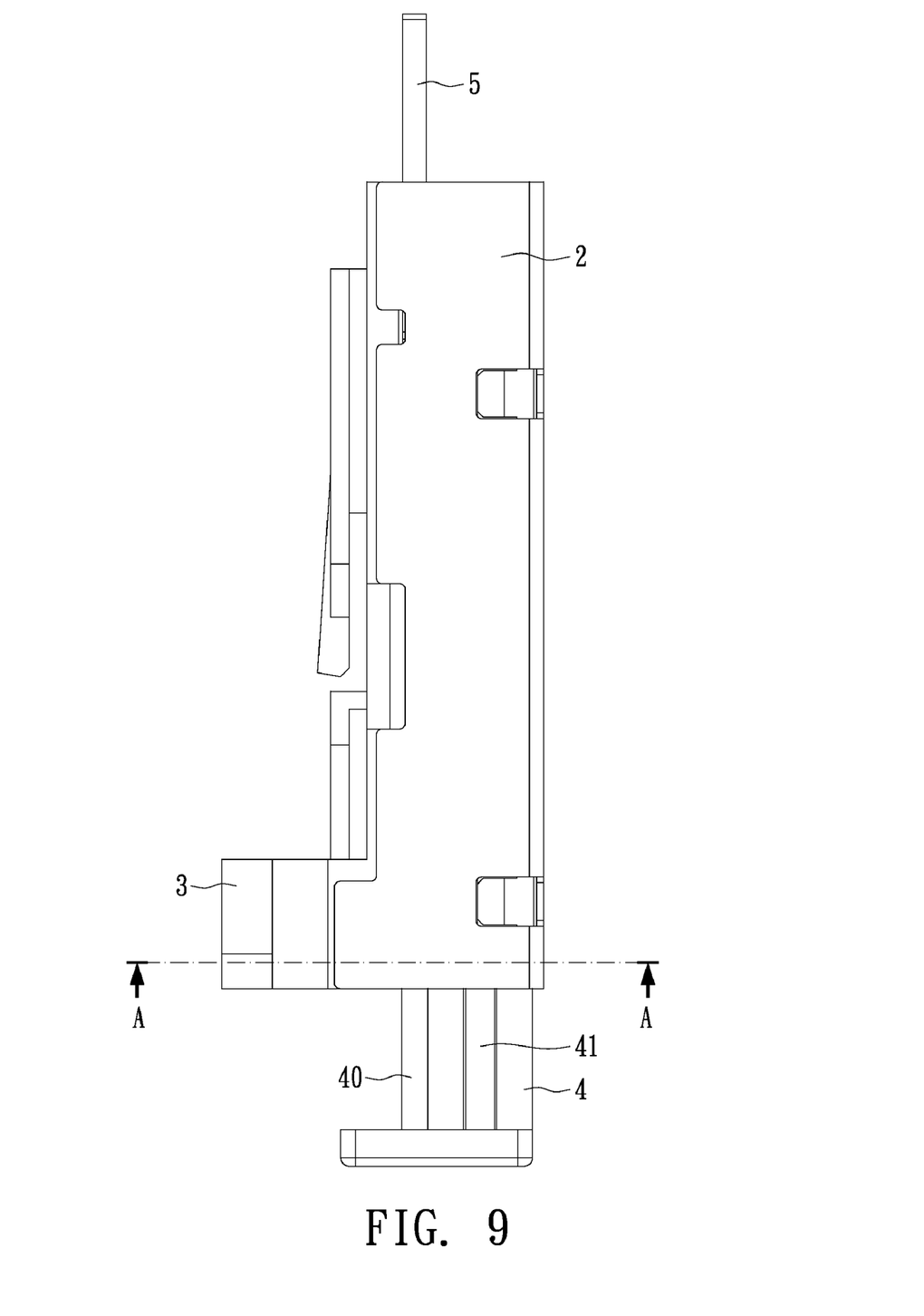
FIG. 9 is a top view of the ejection mechanism of FIG. 4, without showing the swing lever according to a preferred embodiment of the present invention.
Figure 10:
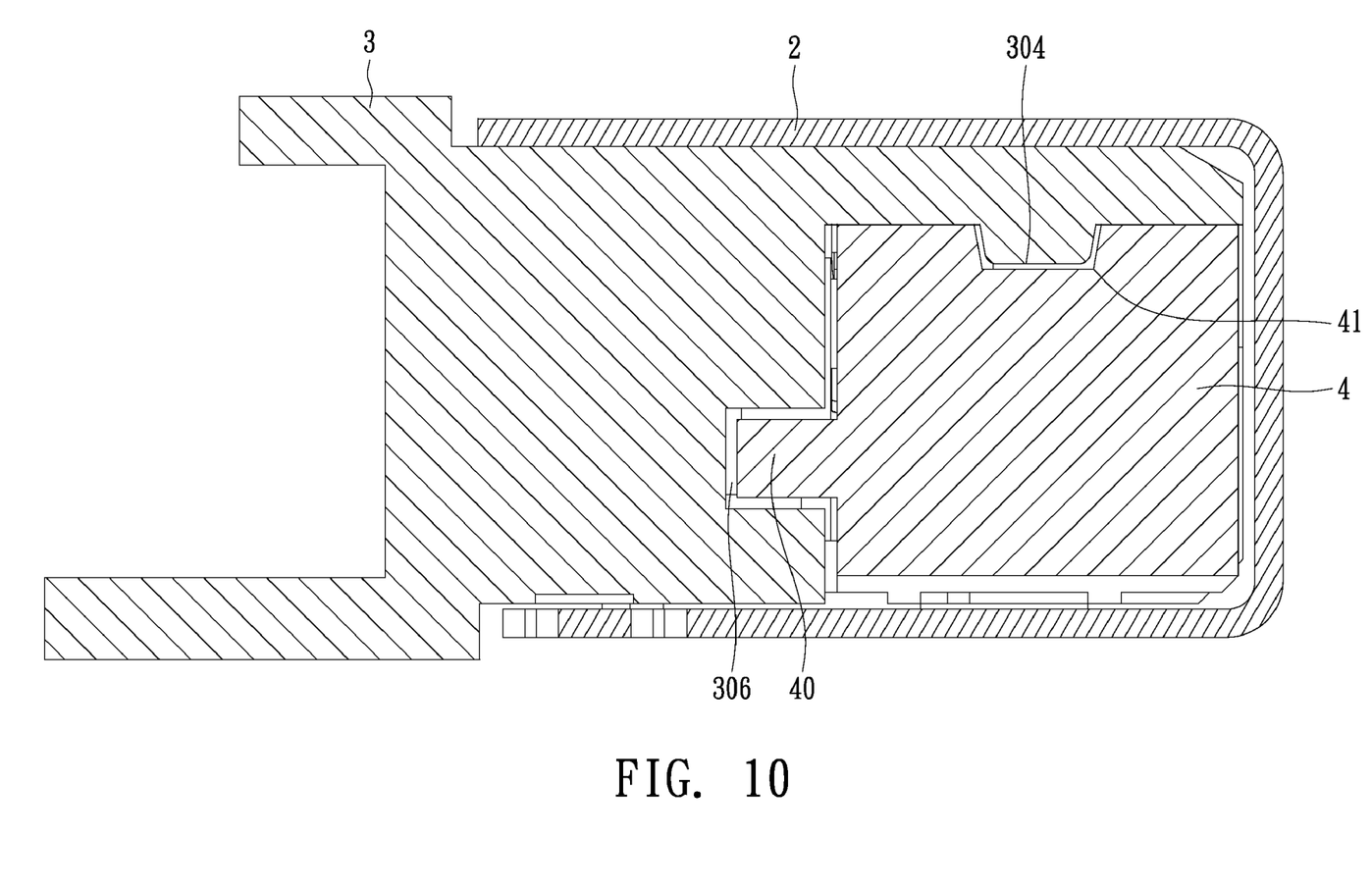
FIG. 10 is a cross-section view along line A-A shown in FIG. 9 according to a preferred embodiment of the present invention.

Referring to FIGS. 8-10, the push rod 4 of the ejection mechanism 13 of the electrical card connector 1 according to the present invention is disposed with a reinforced rib 40, which is received and movable in the receiving groove 306 of the base 3. The reinforced rib 40 enhances the mechanical strength of the push rod 4 to withstand outside impact forces, and it also directs and confines the movement of the push rod 4 through the cooperation with the receiving groove 306 and reduces the risk of breaking and shifting in vertical direction of the push rod 4. Additionally, the reinforced rib 40 and the push rod 4 are made of plastic material, and they can be formed integrally for low cost and simplify the manufacturing process.

A guide groove 41 defined on the bottom surface of the push rod 4 is configured for receiving the guide rib 304 movable therein. The engagement between the guide groove 41 and the guide rib 304 prevents the push rod 4 from lateral shifting. The engagement between the reinforced rib 40 and the receiving groove 306 and the engagement between the guide groove 41 and the guide rib 304 together confine the push rod 4 in lateral and vertical direction and ensure that the push rod 4 moves back and forth in a straight line, preventing the shift lever 6 from moving out of the positioning track 305 and guaranteeing the functioning of the push rod 4.

The above-described embodiments of the present invention are intended to be illustrative only. Numerous alternative embodiments may be devised by persons skilled in the art without departing from the scope of the following claims.

What is claimed is:

1. An electrical card connector comprising:
   an insulative housing;
   a shield covering the insulative housing, wherein the shield and the insulative housing define a receiving space for receiving an electrical card;
   a plurality of terminals received within the insulative housing; and an ejection mechanism disposed on one side of the receiving space, the ejection mechanism comprising a base and a movable push rod mounted within the base;

wherein a reinforced rib protrudes from a surface of a rear portion of the push rod, and a corresponding receiving groove is defined on the base for receiving said the reinforced rib movable therein, wherein a concave recess is configured in the base for receiving the push rod, the recess is surrounded by a bottom wall and an adjacent side wall of the base, the receiving groove is defined on the side wall along a longitudinal direction of the base, and the reinforced rib extends along a longitudinal direction of the push rod and protrudes toward the side wall.

2. The electrical card connector according to claim 1, wherein a guide groove is defined on a surface of the rear portion of the push rod, and a guide rib protrudes from the base, which is received within said guide groove and movable therein.

3. The electrical card connector according to claim 2, wherein the guide rib protrudes upwardly from the bottom wall of the base, and the guide groove is defined on a surface facing the bottom wall and extends along the longitudinal direction of the push rod.

4. The electrical card connector according to claim 1, wherein the base comprises a positioning track concavely formed on the bottom wall, and the ejection mechanism further comprises a shift lever, wherein one end of the shift lever is held in the push rod and the other end is selectively positioned in the positioning track.

5. The electrical card connector according to claim 1, wherein the ejection mechanism further comprises:

a driving bar configured for transmitting a driving force from the push rod;

an elastic element configured for providing an elastic restoration force to the push rod; and a swing lever engaging with the driving bar, configured for ejecting the electrical card.

6. The electrical card connector according to claim 1, wherein a transversely extending handle is disposed at the rear end of the push rod; the reinforced rib extends along a longitudinal direction in the surface of the push rod, and joins with said handle.

7. The electrical card connector according to claim 1, wherein the reinforced rib and the push rod are made of plastic material and formed integrally.

8. An electrical card connector, comprising:

an insulative housing;

a shield covering the insulative housing, wherein the shield and the insulative housing define a receiving space for receiving an electrical card;

a plurality of terminals received within the insulative housing;

an ejection mechanism disposed on one side of the receiving space, the ejection mechanism comprising a base and a movable push rod mounted within the base, wherein the ejection mechanism further comprises a metal frame, which encloses the base and the push rod; a plurality of retention clips extend out from the metal frame, and the base comprises a plurality of retention grooves that correspond to and mate with said retention clips; and wherein a reinforced rib protrudes from a surface of a rear portion of the push rod, and a corresponding receiving groove is defined on the base for receiving said the reinforced rib movable therein.

9. The electrical card connector according to claim 8, wherein the retention clips respectively extend downwardly from both ends of a top wall of the metal frame, wherein one of the retention clips has an L-shaped cross section; a corresponding L-shaped retention groove is defined in rear end of the base for mating with said L-shaped retention clip.

\* \* \* \* \*